(12) United States Patent
Kim et al.

(10) Patent No.: US 11,770,046 B2
(45) Date of Patent: Sep. 26, 2023

(54) MOTOR INCLUDING TENSION MEMBER

(71) Applicant: KEYANG ELECTRIC MACHINERY CO., LTD., Seoul (KR)

(72) Inventors: Hoecheon Kim, Anyang-si (KR); Youngcheol Kim, Ansan-si (KR); Gun Ho Lee, Bucheon-si (KR)

(73) Assignee: KEYANG ELECTRIC MACHINERY CO., LTD., Seoul (KR)

( * ) Notice: Subject to any disclaimer, the term of this patent is extended or adjusted under 35 U.S.C. 154(b) by 0 days.

(21) Appl. No.: 17/558,116

(22) Filed: Dec. 21, 2021

(65) Prior Publication Data

US 2022/0209622 A1   Jun. 30, 2022

(30) Foreign Application Priority Data

Dec. 30, 2020 (KR) .......................... 10-2020-0188440

(51) Int. Cl.
    *H02K 5/24* (2006.01)
(52) U.S. Cl.
    CPC .................................... *H02K 5/24* (2013.01)
(58) Field of Classification Search
    CPC ........... H02K 2205/03; H02K 2213/09; H02K 5/1672; H02K 5/24
    See application file for complete search history.

(56) References Cited

FOREIGN PATENT DOCUMENTS

| CN | 101752949 | A |   | 6/2010 |
|---|---|---|---|---|
| CN | 102205313 | A |   | 10/2011 |
| CN | 113794345 | A | * | 12/2021 |
| DE | 1118342 | B |   | 11/1961 |
| DE | 102012208972 | A1 | * | 6/2013 |
| JP | 2004-120850 | A |   | 4/2004 |
| JP | 2004120850 | A | * | 4/2004 |
| JP | 2004120850 | A |   | 4/2004 |
| JP | 2011097764 | A |   | 5/2011 |
| JP | 6580204 | B1 |   | 9/2019 |
| KR | 20-2000-0010521 | U |   | 6/2000 |
| KR | 20000010521 | U |   | 6/2000 |
| KR | 10-2008-0077133 | A |   | 8/2008 |
| KR | 10-1226134 | B1 |   | 1/2013 |
| KR | 101226134 | B1 |   | 1/2013 |
| WO | WO-2007060044 | A1 | * | 5/2007 |
| WO | WO-2011018014 | A1 | * | 2/2011 |

OTHER PUBLICATIONS

WO-2011018014-A1, Ling, All pages (Year: 2011).*
DE-102012208972-A1, Herbst, All pages (Year: 2013).*
WO-2007060044-A1, Hawighorst, All pages (Year: 2007).*
JP-2004120850-A, Ohashi et al., All pages (Year: 2004).*
CN-113794345-A, Liu, All pages (Year: 2021).*

* cited by examiner

*Primary Examiner* — Naishadh N Desai
(74) *Attorney, Agent, or Firm* — NKL LAW; Jae Youn Kim (57) ABSTRACT

An electric motor including a tension member is proposed. The electric motor includes the tension member installed therein and composed of step parts stacked in multiple steps, so that structural strength and structural robustness are improved.

8 Claims, 9 Drawing Sheets

MOTOR INCLUDING TENSION MEMBER

CROSS REFERENCE TO RELATED APPLICATION

The present application claims priority to Korean Patent Application No. 10-2020-0188440, filed Dec. 30, 2020, the entire contents of which is incorporated herein for all purposes by this reference.

BACKGROUND OF THE INVENTION

Field of the Invention

The present disclosure relates to an electric motor including a tension member and, more particularly, to an electric motor including a tension member in which structural strength and structural robustness are improved by installing the tension member composed of step parts stacked in multiple steps.

Description of the Related Art

In general, motors may be divided into brush motors and brushless motors (i.e., BLDC Motor). Among the motors, the brush motors are widely used in various industrial environments due to a relative low price compared to that of brushless motors.

The brush-type permanent magnet motor includes: a yoke assembly in which a permanent magnet is disposed inside a yoke; and an armature assembly in which an armature coil is wound on a core of a rotating shaft, and a commutator is press-fitted to a front end of the armature coil. After the armature assembly, which is a rotor, is disposed while maintaining a gap inside the permanent magnet of the yoke assembly, which is a stator, when electric current flows through the armature coil, electromagnetic force is generated between the armature coil and the permanent magnet, so that the armature assembly rotates according to Fleming's left-hand rule, thereby obtaining power.

A bush is inserted into the rotating shaft of such a motor, and the bush eliminates a gap between the rotating shaft and peripheral parts, and in this way, the rotating shaft rotates stably without any swinging. The bush may be made of a metal or synthetic resin material, and in some cases, two or more bushes are used at the same time.

Meanwhile, in such a bush, a gap in a circumferential direction of the rotating shaft may be reduced, that is, the gap between the rotating shaft and the peripheral parts, but it is difficult to reduce a gap in an axial direction. The bush should be designed and manufactured with a precise thickness because when there occurs an error in the thickness, a gap between parts may not be completely eliminated. Even when the bush is made of a synthetic resin material instead of a metal material, since the amount of elastic deformation is not large, there is a limit to reducing the gap.

As described above, when the bush does not reduce the gap in the axial direction of the rotating shaft, there is a problem that noise and vibration are generated during rotation of the rotating shaft. For example, the armature assembly may generate noise by hitting the bush during the rotation.

In addition, when more friction between the parts is generated due to the gap, there is also a problem that the durability of the parts is deteriorated.

Documents of Related Art (Patent Document 1) Korean Patent Application Publication No. 10-2008-0077133

(Patent Document 2) Japanese Patent Application Publication No. 2004-120850

SUMMARY OF THE INVENTION

An objective of the present disclosure is to solve the problems of the related art as described above, and is to provide an electric motor including a tension member in which structural strength and structural robustness are improved by installing the tension member composed of step parts stacked in multiple steps.

According to features of the present disclosure for achieving the above objectives, there is provided an electric motor including a tension member, the electric motor including: a yoke assembly configured to form a magnetic field; an armature assembly formed by a coil wound on a core slot formed in a core and disposed inside the yoke assembly, so as to rotate about a rotating shaft; a front bush coupled to an outer side of the rotating shaft, so as to reduce a gap with peripheral parts; and a tension member fitted to the rotating shaft and positioned between the armature assembly and the front bush, so as to prevent a gap between the front bush and the armature assembly, wherein the tension member is formed in a shape in which a plurality of step parts is stacked in multiple steps, so that one surface of the tension member may be in close contact with the front bush and an opposite surface thereof may be in close contact with the armature assembly.

The plurality of step parts may be configured to gradually become smaller in diameter from one side to an opposite side thereof.

Each of the plurality of step parts may include: a step body formed of a ring shape; and an elastic plate formed by being bent in a central axis direction at an end of the step body and connected to another different step part.

The electric motor including the tension member may further include elastic force adjustment grooves each formed by being recessed by a predetermined depth on an outer surface or an inner surface of the tension member, so as to adjust an elastic force of the tension member.

The elastic force adjustment grooves may be respectively disposed side by side in lines on the outer surface or the inner surface of the tension member.

The elastic force adjustment grooves may be disposed by being misaligned with each other on the outer surface or the inner surface of the tension member.

The electric motor including the tension member according to the present disclosure as described above has the following effects.

As the tension member of the present disclosure has a structure in which step parts in a form stacked in multiple steps are consecutively disposed, structural strength and structural robustness are improved compared to those of a bush structure and spring structure that prevent a gap inside a conventional motor, and thus there is an effect that the durability and strength of the tension member are reinforced.

In addition, in the tension member of the present disclosure, elastic force adjustment grooves may be additionally formed, and as elastic force are variously adjustable in the same tension member due to such disposing of the elastic force adjustment grooves, there is an effect that the versatility of the tension member is expanded.

DETAILED DESCRIPTION OF THE INVENTION

Hereinafter, some exemplary embodiments of the present disclosure will be described in detail through exemplary views. In adding reference numerals to the components of each drawing, it should be noted that the same reference numerals are used to refer to the same components as much as possible even if displayed on different drawings. Further, in the following description, if it is decided that the detailed description of a known function or configuration related to the disclosure makes the subject matter of the disclosure unclear, the detailed description is omitted.

In addition, in describing the components of the exemplary embodiments of the present disclosure, terms such as first, second, A, B, (a), (b), and the like can be used. Since these terms are provided merely for the purpose of distinguishing the components from each other, they do not limit the nature, sequence, or order of the components. If a component is described as being "connected", "coupled", or "linked" to another component, that component may be directly connected or connected to that other component. However, it should be understood that yet another component between each of the components may be "connected", "coupled", or "linked" to each other.

The present disclosure relates to an electric motor (hereinafter referred to as an "electric motor") including a tension member, and the electric motor is used to operate various devices by generating a driving force. For example, the electric motor of the present disclosure may be used to automatically move seats of a vehicle forward or backward. To this end, the electric motor of the present disclosure requires a part, e.g., a brush card assembly, for receiving power supplied from a battery (not shown), but since the brush card assembly is not the main content of the present disclosure, the description will be omitted, and hereinafter, parts of the armature assembly 40 and the yoke assembly 10 constituting the electric motor of the present disclosure will be particularly described.

Figure 1:
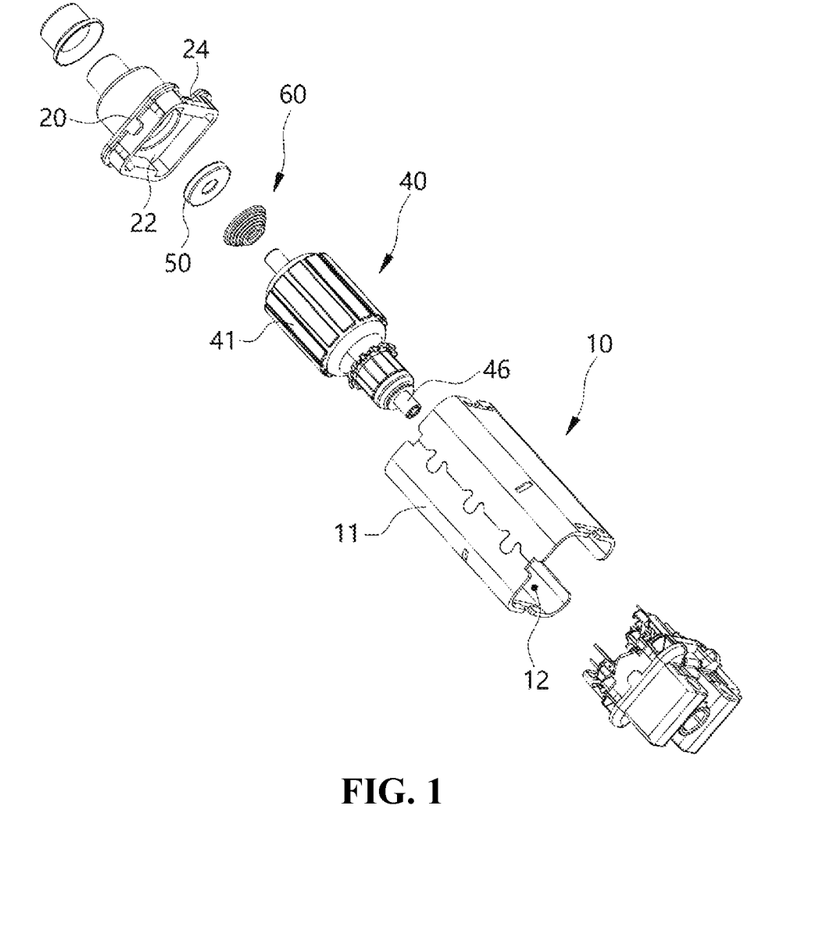
FIG. 1 is an exploded perspective view illustrating a configuration of a preferred exemplary embodiment of an electric motor including a tension member according to the present disclosure.
Figure 2:
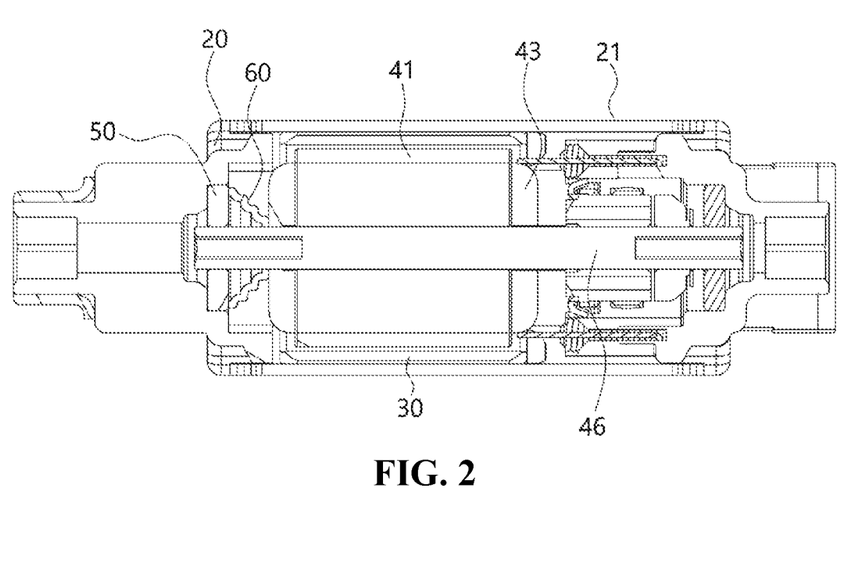
FIG. 2 is a cross-sectional view illustrating the configuration of the preferred exemplary embodiment of the electric motor including the tension member according to the present disclosure.
Figure 3:
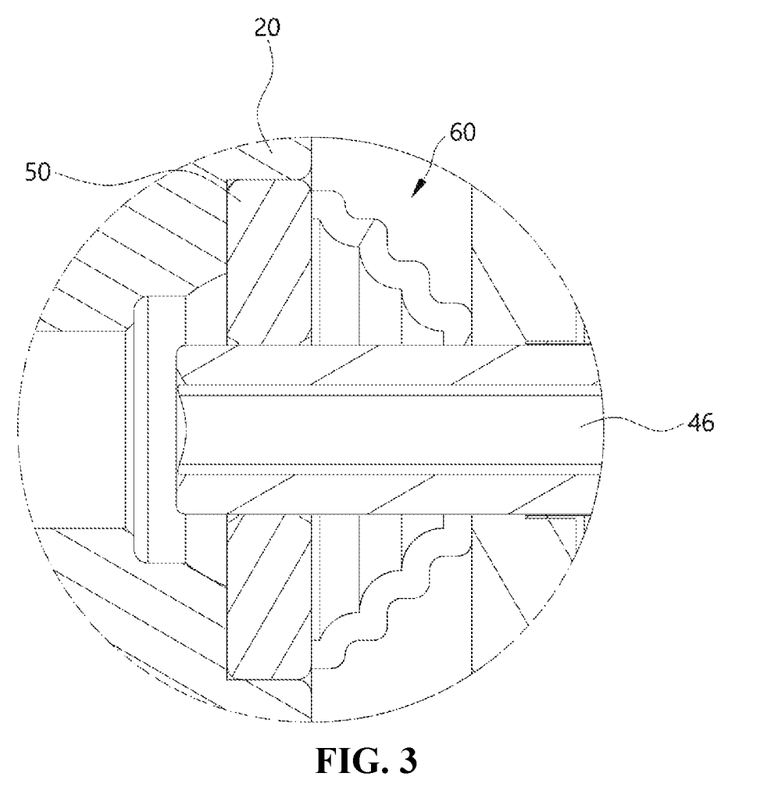
FIG. 3 is an enlarged cross-sectional view illustrating a state in which the tension member is installed between a front bush and an armature assembly constituting the exemplary embodiment of the present disclosure.

FIG. 1 is an exploded perspective view illustrating a configuration of a preferred exemplary embodiment of an electric motor including a tension member according to the present disclosure, FIG. 2 is a cross-sectional view illustrating the configuration of the preferred exemplary embodiment of the electric motor including the tension member according to the present disclosure, and FIG. 3 is an enlarged cross-sectional view illustrating a state in which the tension member is installed between the front bush and the armature assembly constituting the exemplary embodiment of the present disclosure.

As shown in FIGS. 1 to 3, first, the yoke assembly and the armature assembly among the components of the present disclosure will be described in detail.

The yoke assembly 10 and the armature assembly 40 rotate relative to each other. More precisely, the armature assembly 40 accommodated in the fixed yoke assembly 10 rotates relative to the yoke assembly 10. To this end, the armature assembly 40 is supplied with power from the outside, and the armature assembly 40 converts the power from electrical energy to rotational energy.

Referring to the structure of the yoke assembly 10, the yoke 11 in a cylindrical or rectangular parallelepiped shape forms the external frame of the yoke assembly 10. The yoke 11 is again inserted into a separate motor housing (not shown), and a gear assembly or the like may be coupled to one side of the motor housing. In addition, a brush card assembly is further assembled on an upper part of the yoke 11, and although it is shown in the drawings, a detailed description of the general brush card assembly is omitted.

There is a rotation space 12 inside the yoke 11, and there is a stator magnet 30 on the inner circumferential surface of the rotation space 12. The stator magnet 30 provides a magnetic force for rotating the armature assembly 40 to be described below. That is, the yoke assembly 10 generates a magnetic field. A plurality of stator magnets 30 is provided along the inner circumferential surface of the rotation space 12, and the stator magnets are spaced apart from each other therebetween.

A cover 20 is assembled to the yoke assembly 10. The cover 20 is assembled with the yoke assembly 10 to generate an assembly space therebetween. More precisely, the inner space 22 of the cover 20 and the rotation space 12 of the yoke 11 are connected to each other to form one assembly space. The cover 20 is coupled to the front of the yoke assembly 10, and is assembled in such a way that a stepped section 24 in the cover 20 is inserted into the yoke 11.

The armature assembly 40 is inserted into the assembly space formed by the yoke assembly 10 and the cover 20. The armature assembly 40 receives power from the outside and converts electrical energy into rotational energy, and in this way, the armature assembly 40 may rotate relative to the yoke 11. When the armature assembly 40 is rotated, the rotating shaft 46 positioned at the center thereof rotates together and transmits a rotational force to a gear assembly (not shown) or the like. Since the rotating shaft 46 is coupled along the center of the armature assembly 40, the rotating shaft 46 may be viewed as the center of rotation. A core 41 is formed on the frame of the armature assembly 40, and the core 41 may be viewed as a substantial cylindrical shape having the rotating shaft 46 at the center thereof and surrounding the periphery of the armature assembly 40.

The core 41 is configured by stacking a plurality of core plates. Each core plate is composed of a thin metal steel plate, and when the core plates of the same shape are stacked, a three-dimensional shape as shown in FIG. 2 is obtained. A coil (i.e., enamel copper wire) 43 is wound around the core 41. The coil 43 constitutes the armature assembly 40 while repeatedly winding the winding legs (not shown) extending radially from the core 41.

The front bush 50 is inserted into the rotating shaft 46. The front bush 50 is fitted in a front part of the rotating shaft 46, and has a cylindrical shape as shown in FIG. 1. The front bush 50 fills an empty space between the front part of the rotating shaft 46 and the periphery surrounding the rotating shaft 46. In this way, the rotating shaft 46 may rotate without a gap. In the present exemplary embodiment, the front bush 50 is made of a metal material, but it is not necessarily limited thereto. For example, the front bush 50 may be made of various materials such as synthetic resin, urethane, and rubber.

Figure 4:
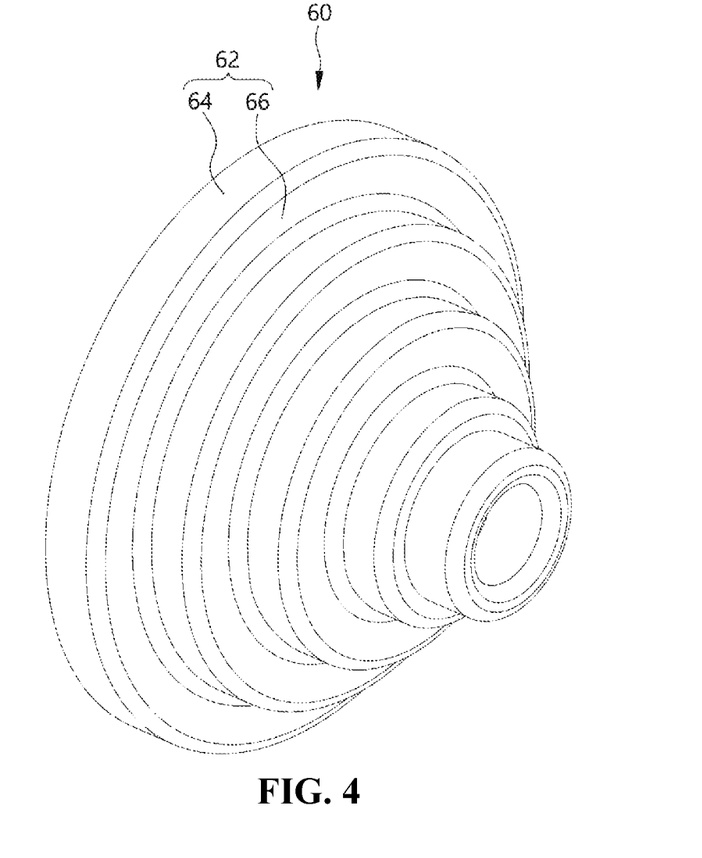
FIG. 4 is a perspective view illustrating the configuration of the tension member constituting the exemplary embodiment of the present disclosure.
Figure 5:
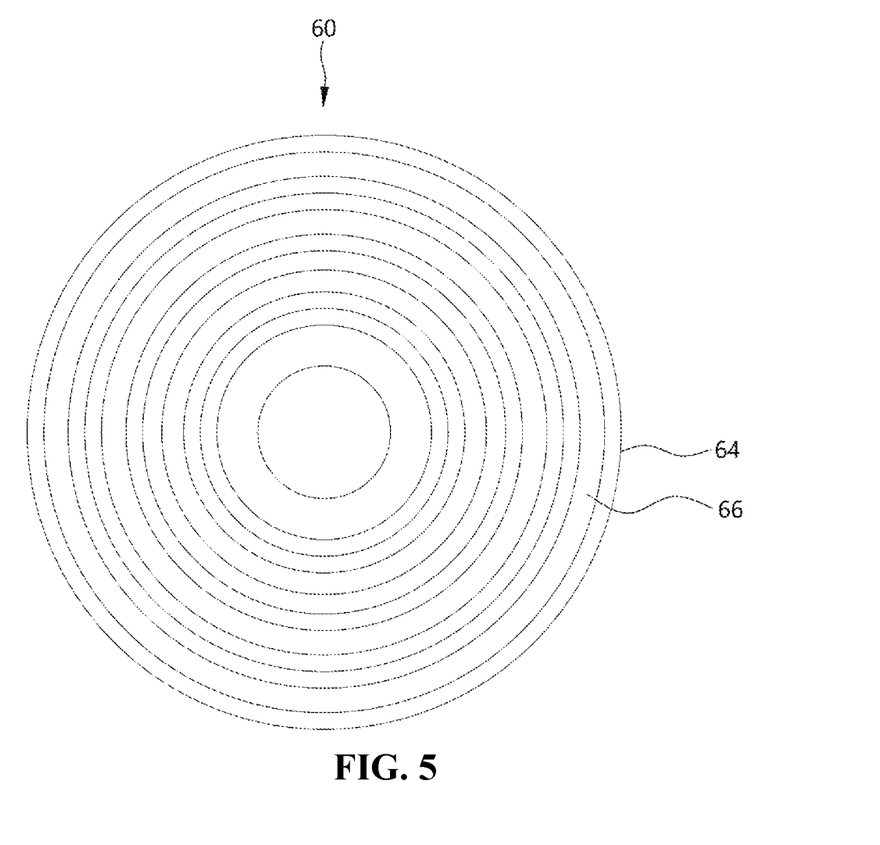
FIG. 5 is a side view illustrating the configuration of the tension member constituting the exemplary embodiment of the present disclosure.
Figure 6:
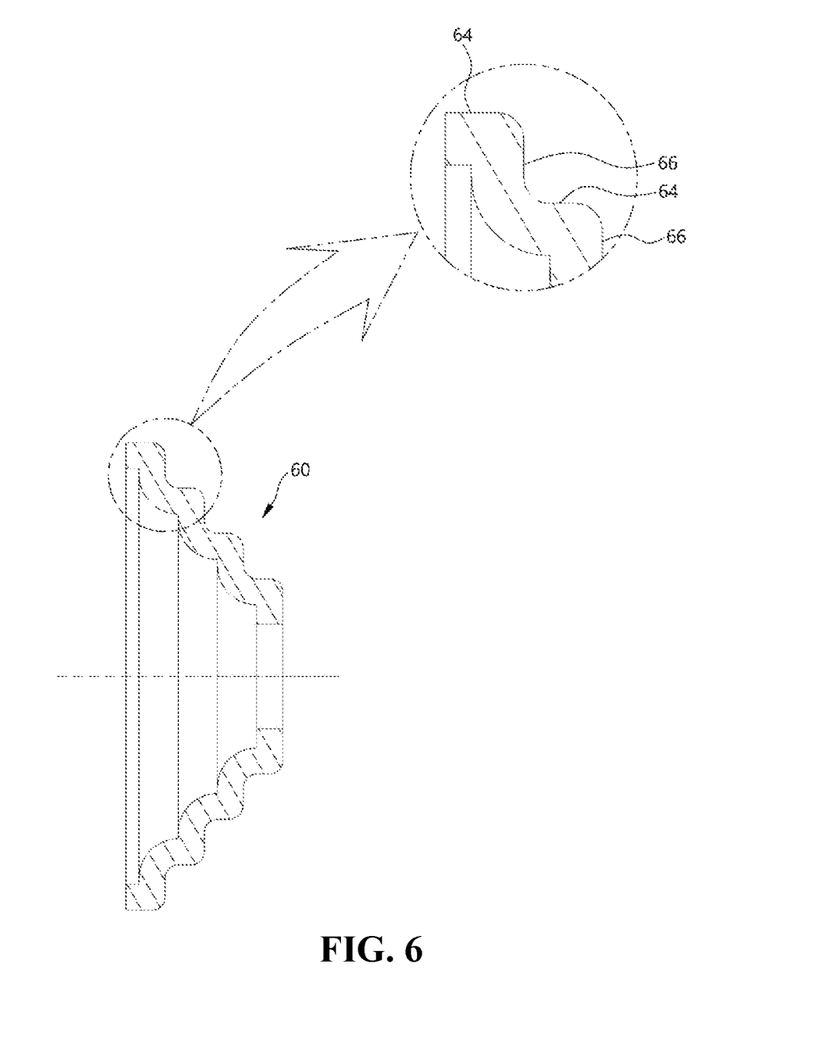
FIG. 6 is a cross-sectional view illustrating the configuration of the tension member constituting the exemplary embodiment of the present disclosure.
Figure 7:
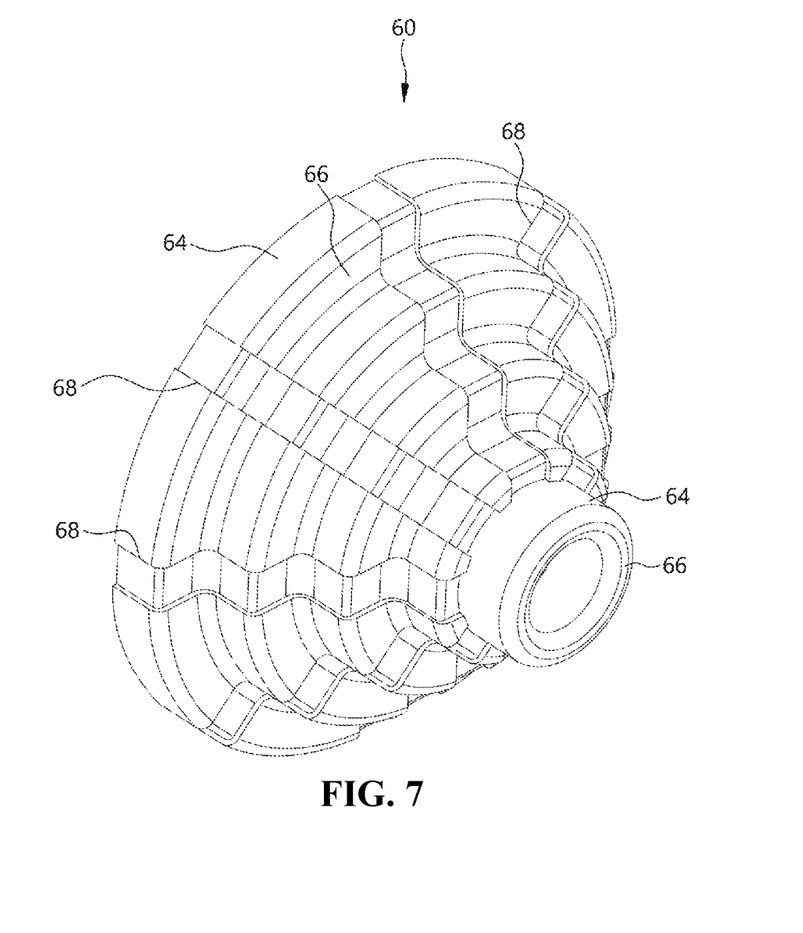
FIG. 7 is a perspective view illustrating a state in which elastic force adjustment grooves are respectively disposed side by side in lines on an outer surface of the tension member constituting the exemplary embodiment of the present disclosure.
Figure 8:
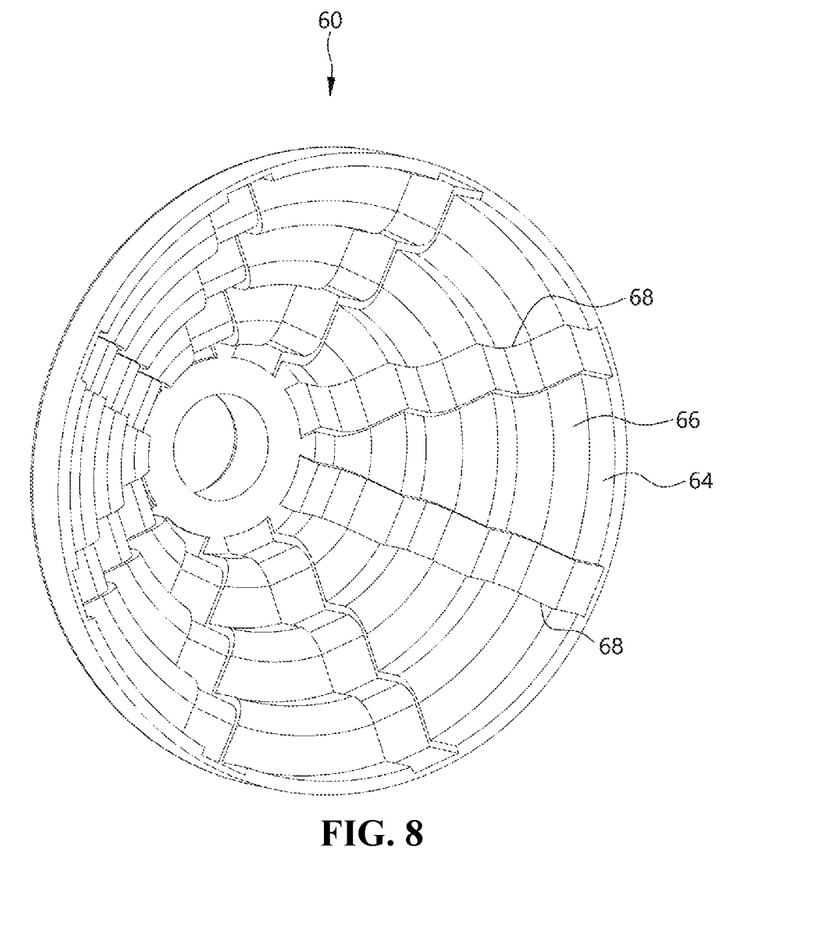
FIG. 8 is a perspective view illustrating a state in which the elastic force adjustment grooves are respectively disposed side by side in lines on an inner surface of the tension member constituting the exemplary embodiment of the present disclosure.
Figure 9:
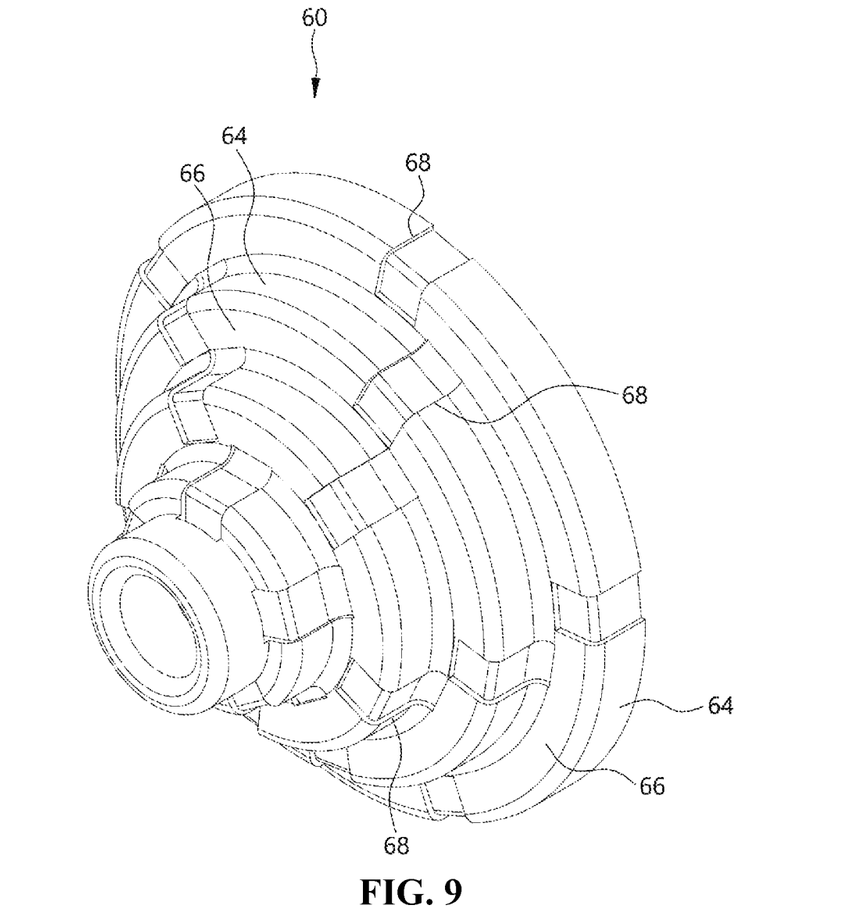
FIG. 9 is a perspective view illustrating a state in which the elastic force adjustment grooves are disposed by being misaligned with each other on the outer surface of the tension member constituting the exemplary embodiment of the present disclosure.

FIG. 4 is a perspective view illustrating the configuration of the tension member constituting the exemplary embodiment of the present disclosure, FIG. 5 is a side view illustrating the configuration of the tension member constituting the exemplary embodiment of the present disclosure, FIG. 6 is a cross-sectional view illustrating the configuration of the tension member constituting the exemplary embodiment of the present disclosure, FIG. 7 is a perspective view illustrating a state in which elastic force adjustment grooves are respectively disposed side by side in lines on an outer surface of the tension member constituting the exemplary embodiment of the present disclosure, FIG. 8 is a perspective view illustrating a state in which the elastic force adjustment grooves are respectively disposed side by side in lines on an inner surface of the tension member constituting the exemplary embodiment of the present disclosure, and FIG. 9 is a perspective view illustrating a state in which the elastic force adjustment grooves are disposed by being misaligned with each other on the outer surface of the tension member constituting the exemplary embodiment of the present disclosure.

As shown in FIGS. 4 to 9, the tension member 60 will be described in detail here.

The tension member 60 is fitted to the rotating shaft 46 (refer to FIG. 2). The tension member 60 is positioned between the front bushing 50 and the yoke assembly 10, and similar to the front bush 50, the tension member 60 also fills in the empty space between the periphery surrounding the front part of the rotating shaft 46 and the rotating shaft 46. However, the tension member 60 may also perform a function of preventing a gap in the axial direction of the rotating shaft 46, that is, a gap between the front bush 50 and the armature assembly 40, and the function is performed by the elastic force of the tension member 60. The tension member 60 may be elastically deformable not only in material but also in structure, and the specific structure will be described in detail below.

The tension member 60 may be made of a metal material or a synthetic resin material. The tension member 60 is formed in a shape in which a plurality of step parts 62 is stacked in multiple steps.

In addition, the plurality of step parts 62 of the tension member 60 may be formed to gradually become smaller in diameter from left to right.

As the tension member 60 is not only formed in the step shape stacked in multiple steps, but also is formed to gradually become smaller in diameter from left to right, the tension member 60 elastically supports a position adjacent to the rotating shaft 46 where vibration is generated, whereby the elastic support force of the tension member 60 may be improved.

Each step part 62 is made of a step body 64, an elastic plate 66, and the like. The step body 64 is formed in a ring shape or a tube shape having a cavity therein. The elastic plate 66 to be described later is provided at one end, or each opposite end of the step body 64. The step body 64 serves to connect the different elastic plates 66 to each other.

The elastic plate 66 is formed at an end of the step body 64. The elastic plate 66 is formed by being vertically bent at the end of the step body 64 in a central axis direction. The elastic plate 66 is integrally formed with the step body 64, so that different step bodies 64 are respectively connected to the ends of the elastic plate 66, thereby serving to elastically support the different step bodies 64.

That is, as the elastic plate 66 is disposed between different step bodies 64, a plurality of elastic plates 66 disposed in multiple steps is elastically deformed when a load is applied in the axial direction by the rotating shaft 46, whereby the load applied to the tension member 60 may be distributed and applied.

In addition, the tension member 60 has a structure of having the plurality of step parts 62 integrally formed, whereby structural strength may be further improved compared to that of tension members or elastic bushes, which are composed in a structure in which parts different from each other are assembled.

The elastic force adjustment grooves 68 are formed on the outer surface or the inner surface of the tension member 60. Each elastic force adjustment groove 68 is recessed by a predetermined depth on the outer surface or inner surface of the tension member 60.

As shown in FIG. 7 or 8, a plurality of elastic force adjustment grooves 68 may be radially formed respectively side by side in lines at a predetermined angle on the outer surface or the inner surface of the tension member 60. Each elastic force adjustment groove 68 is a part for increasing an elastic force by forming a form thickness to be small on some parts of the tension member 60.

In addition, in a case where the elastic force adjustment grooves 68 are respectively disposed side by side in lines, different elastic force adjustment grooves 68 are disposed adjacent to each other, so that the elastic force of the tension member 60 may be further improved.

As shown in FIG. 9, the plurality of elastic force adjustment grooves 68 may be disposed by being misaligned with each other on the inner surface of the tension member 60.

As the elastic force adjustment grooves 68 are disposed by being misaligned with each other on the inner surface of the tension member 60, the elastic force may not be improved compared to that of the structure in which the elastic force adjustment grooves 68 are respectively disposed side by side in lines, but a decrease in the structural strength of the tension member 60 may be minimized compared to that of the structure of the elastic force adjustment grooves 68 respectively disposed side by side in the lines.

Next, a process in which the tension member acts in the electric motor including the tension member of the present disclosure will be described.

When the yoke assembly 10, the armature assembly 40, the rotating shaft 46, the cover 20, the front bush 50, and the tension member 60, which are described above, are all assembled, the assembled state becomes a state as shown in FIG. 2. In this case, since a length of the tension member 60 is greater than a distance between the front bushing 50 and the yoke assembly 10, an overlap section is generated, and thus the tension member 60 is elastically deformed to some extent in a longitudinal direction of the rotating shaft 46.

In an elastically deformed state, the tension member 60 is positioned between the front bush 50 and the yoke assembly 10 that are respectively positioned on opposite sides of the tension member 60, so an axial direction gap between the front bush 50 and the yoke assembly 10 may be eliminated. In particular, since an entire structure of the tension member 60 is elastically deformable, a larger gap may be reduced, thereby enabling compensation for not only an assembly gap but also a gap generated in a production process.

Describing the process in which the tension member 60 is elastically deformed, a compressive force in the axial direction is applied to the elastic plate 66 adjacent to the rotating shaft 46, the compressive force is transmitted to the step parts 62 formed in the shape stacked in multiple steps, the elastic plate 66 of each step part 62 is consecutively and elastically deformed, and thus the compressive force applied in the axial direction may be absorbed.

Therefore, the tension member 60 may not only prevent a gap but also absorb an impact between the parts, the impact being generated in the operation process of the motor. As a result, there is provided an effect of reducing noise of the motor.

In addition, as the step parts 62 in the shape stacked in multiple steps are consecutively disposed, the tension member 60 of the present disclosure has the structure in which structural strength and structural robustness are reinforced compared to those of the conventional elastic bushes or tension members.

In addition, the tension member 60 of the present disclosure may be additionally formed with the elastic force adjustment grooves 68, and the elastic force of the tension member may be variously adjusted due to the arrangement of the elastic force adjustment grooves 68.

In the description above, although the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. In addition, the terms "comprise", "include", or "have" described above mean that the corresponding component may be inherent unless otherwise stated, and thus it should be construed that it may further include other components, not to exclude other components. That is, terms like "include", "comprise", and "have" should be interpreted in default as inclusive or open rather than exclusive or closed unless expressly defined to the contrary. In the flowing description, unless otherwise defined, all terms including technical and scientific terms used herein have the same meaning as commonly understood by those skilled in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Although exemplary aspects of the present disclosure have been described for illustrative purposes, those skilled in the art will appreciate that various modifications, additions and substitutions are possible, without departing from essential characteristics of the disclosure. Therefore, the embodiments disclosed in the present disclosure are not intended to limit the technical idea of the present disclosure but to describe the present disclosure, and the scope of the technical idea of the present disclosure is not limited by these embodiments. The scope of protection of the present disclosure should be interpreted by the following claims, and all technical ideas within the scope equivalent thereto should be construed as being included in the scope of the present disclosure.

What is claimed is:

1. An electric motor including a tension member, the electric motor comprising:
   a yoke assembly configured to form a magnetic field;
   an armature assembly formed by a coil wound on a core slot formed in a core and disposed inside the yoke assembly, so as to rotate about a rotating shaft;
   a front bush coupled to an outer side of the rotating shaft, so as to reduce a gap with peripheral parts; and
   a tension member fitted to the rotating shaft and disposed between the armature assembly and the front bush, so as to prevent a gap between the front bush and the armature assembly,
   wherein the tension member is formed in a shape in which a plurality of step parts is stacked in multiple steps, and
   wherein each of the plurality of step parts comprises:
   a step body formed of a ring shape; and
   an elastic plate formed by being bent in a central axis direction at an end of the step body and connected to another different step part.

2. The electric motor of claim 1, wherein one surface of the tension member is in close contact with the front bush and an opposite surface thereof is in close contact with the armature assembly.

3. The electric motor of claim 1, wherein the plurality of step parts is configured to gradually become smaller in diameter from one side to an opposite side thereof.

4. An electric motor including a tension member, the electric motor comprising:
   a yoke assembly configured to form a magnetic field;
   an armature assembly formed by a coil wound on a core slot formed in a core and disposed inside the yoke assembly, so as to rotate about a rotating shaft;
   a front bush coupled to an outer side of the rotating shaft, so as to reduce a gap with peripheral parts;
   a tension member fitted to the rotating shaft and disposed between the armature assembly and the front bush, so as to prevent a gap between the front bush and the armature assembly; and
   elastic force adjustment grooves each formed by being recessed by a predetermined depth on an outer surface or an inner surface of the tension member, so as to adjust an elastic force of the tension member,
   wherein the tension member is formed in a shape in which a plurality of step parts is stacked in multiple steps.

5. The electric motor of claim 4, wherein the elastic force adjustment grooves are respectively disposed side by side in lines on the outer surface or the inner surface of the tension member.

6. The electric motor of claim 4, wherein the elastic force adjustment grooves are disposed by being misaligned with each other on the outer surface or the inner surface of the tension member.

7. The electric motor of claim 4, wherein the elastic force adjustment grooves are disposed by being misaligned with each other for each of the plurality of step parts.

8. The electric motor of claim 4, wherein the elastic force adjustment grooves are radially disposed respectively side by side in lines at a predetermined angle relative to a central axis of the tension member.

* * * * *